(12) United States Patent
Huang

(10) Patent No.: US 11,239,491 B2
(45) Date of Patent: Feb. 1, 2022

(54) SOLID STATE ELECTROLYTE AND ELECTROCHEMICAL CELL INCLUDING THE ELECTROLYTE

(71) Applicant: University of South Carolina, Columbia, SC (US)

(72) Inventor: Kevin Huang, Columbia, SC (US)

(73) Assignee: University of South Carolina, Columbia, SC (US)

( * ) Notice: Subject to any disclaimer, the term of this patent is extended or adjusted under 35 U.S.C. 154(b) by 649 days.

(21) Appl. No.: 15/807,934

(22) Filed: Nov. 9, 2017

(65) Prior Publication Data
US 2018/0138543 A1 May 17, 2018

Related U.S. Application Data

(60) Provisional application No. 62/420,666, filed on Nov. 11, 2016.

(51) Int. Cl.
| | | |
|---|---|---|
| *H01M 10/056* | (2010.01) | |
| *H01M 10/0525* | (2010.01) | |
| *H01M 10/0585* | (2010.01) | |
| *H01M 4/131* | (2010.01) | |
| *H01M 4/134* | (2010.01) | |

(Continued)

(52) U.S. Cl.
CPC ......... *H01M 10/056* (2013.01); *H01M 4/131* (2013.01); *H01M 4/134* (2013.01); *H01M 4/405* (2013.01); *H01M 4/661* (2013.01); *H01M 10/0525* (2013.01); *H01M 10/0565* (2013.01); *H01M 4/505* (2013.01); *H01M 4/525* (2013.01); *H01M 4/808* (2013.01); *H01M 10/0585* (2013.01); *H01M 2300/0071* (2013.01); *H01M 2300/0082* (2013.01); *H01M 2300/0091* (2013.01); *Y02T 10/70* (2013.01)

(58) Field of Classification Search
CPC .......... H01M 10/056; H01M 10/0525; H01M 10/0585; H01M 4/131; H01M 4/134; H01M 4/505; H01M 4/525; H01M 4/808
See application file for complete search history.

(56) References Cited

U.S. PATENT DOCUMENTS

| | | | | |
|---|---|---|---|---|
| 3,335,335 A | * | 8/1967 | Perkins | .................... H01G 9/10 361/519 |
| 6,447,952 B1 | | 9/2002 | Spiegel et al. | |

(Continued)

OTHER PUBLICATIONS

Kamaya, et al. "A lithium superionic conductor" *Nat. Mater.* 10 (2011) pp. 682-686.

(Continued)

*Primary Examiner* — Sarah A. Slifka
*Assistant Examiner* — Rachel L Zhang
(74) *Attorney, Agent, or Firm* — Dority & Manning, P.A.

(57) ABSTRACT

Solid state lithium ion conducting electrochemical cells and methods for forming the cells are described. The electrochemical cells include a composite solid state lithium ion conducting electrolyte separating porous metal supported electrodes. The electrolyte includes a crosslinked oligosiloxane matrix that includes pendant lithium ion chelating functionality that is provided in conjunction with lithium ions and encapsulating lithium ion conducting particles. The solid state electrolyte can extend into the pores of the electrodes to provide high surface area contact and improved electrochemical characteristics.

18 Claims, 2 Drawing Sheets

(51) Int. Cl.
*H01M 4/66* (2006.01)
*H01M 4/80* (2006.01)
*H01M 4/40* (2006.01)
*H01M 4/505* (2010.01)
*H01M 4/525* (2010.01)
*H01M 10/0565* (2010.01)

(56) References Cited

U.S. PATENT DOCUMENTS

| | | | |
|---|---|---|---|
| 6,887,619 B2 | 5/2005 | West et al. | |
| 8,460,823 B1 * | 6/2013 | Delnick | H01M 4/13 429/209 |
| 8,492,033 B2 | 7/2013 | Amine et al. | |
| 9,130,219 B1 | 9/2015 | Huang et al. | |
| 9,236,627 B1 | 1/2016 | Huang et al. | |
| 9,650,301 B1 | 5/2017 | Huang et al. | |
| 2005/0106470 A1 * | 5/2005 | Yoon | H01M 10/0567 429/324 |
| 2010/0330433 A1 * | 12/2010 | Amine | H01G 11/56 429/302 |
| 2014/0234725 A1 * | 8/2014 | Ogawa | H01M 4/131 429/304 |
| 2015/0056520 A1 * | 2/2015 | Thokchom | H01M 10/0562 429/322 |
| 2015/0263382 A1 * | 9/2015 | Singh | H01M 4/131 429/313 |

OTHER PUBLICATIONS

Liu, et al. "An all-in-one nanopore battery array" *Nat. Nanotech.* 9 (2014) pp. 1031-1039.

Nakajima, H. "Fabrication, properties and application of porous metals with directional pores" *Prog. Mater. Sci.* 52 (2007) pp. 1091-1173.

Wang, et al. "Design principles for solid-state lithium superionic conductors" *Nat. Mater.* 14 (2015) pp. 1026-1031.

Zhang, et al. "Three-dimensional bicontinuous ultrafast-charge and-discharge bulk battery electrodes" *Nat. Nanotech.* 6 (2011) pp. 277-281.

* cited by examiner

SOLID STATE ELECTROLYTE AND ELECTROCHEMICAL CELL INCLUDING THE ELECTROLYTE

CROSS REFERENCE TO RELATED APPLICATION

This application claims filing benefit of U.S. Provisional Patent Application Ser. No. 62/420,666 having a filing date of Nov. 11, 2016, which is incorporated herein by reference for all purposes.

BACKGROUND

Lithium-ion battery technology is widely employed in small-scale portable electronics in which the charging/discharging rate is not critically important. For extended applications of lithium ion batteries, for instance for use in mid-scale applications such as pure electric vehicles and large-scale renewable and grid energy storage, the rate of charge/discharge cycles will need to be considerably higher than that of current batteries in order to increase the drivability of the vehicles and maximize the harvest of renewable energy.

Unfortunately, serious safety issues exist when attempting to fast cycle known lithium-ion batteries. At a high charge/discharge rate, the accelerated reactions between organics-based flammable electrolytes and inorganic electrodes release an intense and uncontrollable amount of heat that can cause fire and lead to thermal runaway. Development of nonflammable solid-state electrolytes is widely deemed the solution to this fundamental problem with currently known lithium ion batteries.

All-solid-state lithium ion battery technology has been a very active area of research in recent years. Solid lithium ion-conducting electrolytes have been discovered and electrode microstructural optimizations have been reported. Unfortunately, in order for a solid state lithium ion battery to be a commercially promising product, several problems must still be addressed: 1) existing materials with high ionic conductivity usually exhibit low chemical and electrochemical stability; 2) the performance of thin-film solid state lithium ion batteries is limited by insufficient active sites at the two dimensional electrode/electrolyte interfaces; 3) the possibility of using less conductive ceramics as porous three dimensional support for thin-film solid state lithium ion batteries faces challenges in current collection, thus constraining the rate capacity; and 4) the solid electrolyte membranes developed to date are not strong enough to withstand attack from lithium dendrites formed during repeated and elongated cycling.

Poly(ethylene oxide) (PEO) complexed with lithium salts have been developed as solid polymer electrolytes for lithium batteries. The drawback of PEO-based electrolytes is the tradeoff between ionic conductivity and shear modulus. For instance the shear modulus of the polymer must be at least twice that of lithium metal to sufficiently block the mechanical attack by lithium dendrites that develop over the life of the battery. This requirement has limited lithium ion conductivity of PEO-based polymer electrolytes to about $10^{-7}$-$10^{-9}$ S/cm at room temperature, much lower than the acceptable value about $10^{-3}$ S/cm needed for battery applications.

What are needed in the art are materials for use in forming solid state lithium ion conducting batteries, and in particular solid state electrolyte materials, and methods of forming such materials and batteries.

SUMMARY

According to one embodiment, disclosed is a composite solid state electrolyte. The solid state electrolyte includes a crosslinked lithium ion conducting polymer matrix, lithium ion conducting particles encapsulated in the matrix, and solubilized lithium ion associated with the matrix. More specifically, the polymer matrix includes crosslinked polysiloxanes as backbone component and side chains pendant to the backbone that include lithium ion chelating functionality (e.g., polyether functionality or carbonate functionality) that facilitates lithium ion conductivity across the electrolyte.

Also disclosed is a lithium ion conducting electrochemical cell that includes a cathode, an anode, and a solid state electrolyte as disclosed herein separating the cathode and the anode. The cathode includes a porous cathode support and a cathode active material deposited on the porous cathode support. The anode includes a porous anode active material that includes lithium (e.g., lithium or a lithium containing alloy). The solid state electrolyte can extend within pores of the cathode and the anode.

Methods for forming the solid state electrolyte and electrochemical cells incorporating the electrolyte are also described. For instance, a method can include combining an oligosiloxane that includes lithium ion chelating functionality with lithium ion conducting ceramic particles and a lithium ion source (e.g., a lithium salt) to form a liquid mixture. The method can also include crosslinking the mixture to form a solid-state electrolyte. In one embodiment, a first portion of the liquid mixture can be applied to a porous electrode prior to crosslinking in order that the liquid can impregnate into the pores of the electrode. Following, the polymer can be crosslinked to provide the solid state electrolyte that extends into the porous structure and thereby provides a very high three dimensional contact area in an electrode sub-assembly.

Electrode sub-assemblies that include the solid state electrolyte extending into the pores of the respective electrodes can be assembled with one another and with an electrolyte material between the two. Following, the layers can be laminated to one another, e.g., through application of heat and/or pressure or through crosslinking of a liquid electrolyte mixture held between the cathode and anode, to form a single solid state electrochemical cell.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to solid state lithium ion conducting electrochemical cells and methods for forming the electrochemical cells as well as batteries incorporating the electrochemical cells. The electrochemical cells include a composite solid state lithium ion conducting electrolyte separating porous electrodes. The batteries and materials have been developed by leveraging the high electrical conductivity and mechanical robustness of metals in order to form porous electrodes that can be combined with a solid polymer-based composite electrolyte to achieve high energy density at high cycling rates without invoking safety issues.

Beneficially, the lithium ion conducting batteries can use all-solid-state components that can greatly enhance the safety of the batteries as compared to lithium ion conducting batteries that include liquid electrolytes. In addition, the batteries can include active materials in the electrodes that are both high in energy density and low in volumetric mass density, which can provide for high gravimetric energy density for a wide variety of applications, such as use in electric vehicles and aerospace applications. The batteries can also exhibit improved interfacial properties and in particular a three dimensional triple phase boundary leading to high rate-capacity. The composite electrolyte material can exhibit high strength without loss of the desirable elastic qualities of a solid polymer electrolyte, so as to alleviate dendrite shorting and extend battery lifespan. Moreover, the composite electrolyte material is very stable, which can widen the electrochemical stability window.

Figure 1:
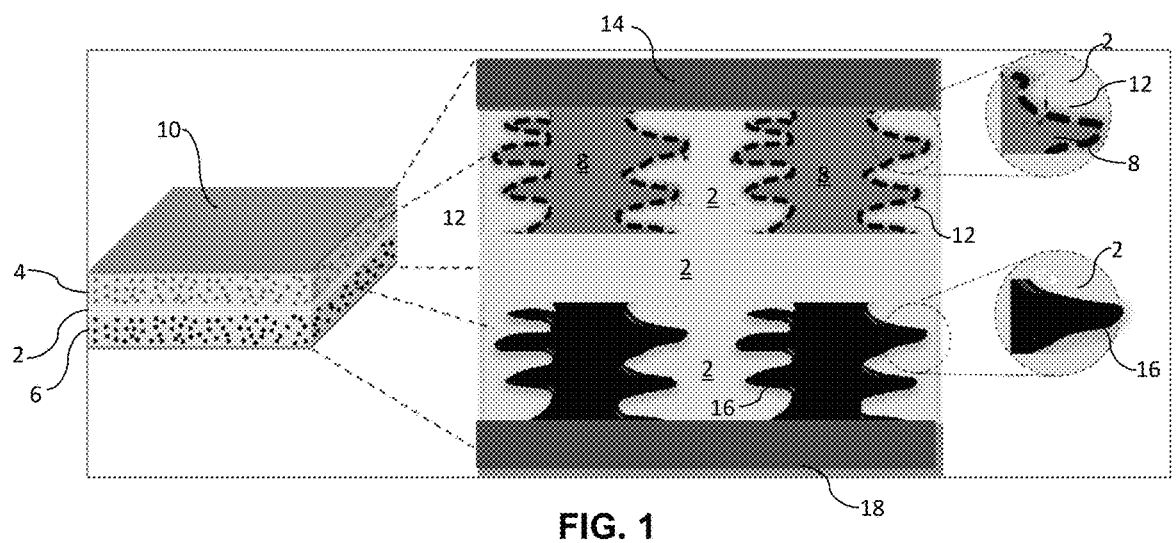
FIG. 1 schematically illustrates a single solid state cell as described herein in increasingly magnified images and including a solid state lithium ion conducting electrolyte supported by two porous electrodes.

An electrochemical cell 10 as may form a battery as disclosed herein is schematically illustrated in FIG. 1, which includes increasingly magnified views across the left, center and right panel. As shown, the cell 10 can include a solid state lithium ion conducting electrolyte 2 that separates a cathode (or positive electrode) 4 from an anode 6 (or negative electrode). In the magnified view of the center panel of FIG. 1 a cross sectional view of the cell 10 illustrates a cathode current collector 14 in electrical communication with a porous cathode support 8 upon which the cathode active material 12 has been deposited. The anode current collector 18 likewise is in electrical communication with a porous anode active material 16. As shown, the material that forms the solid state lithium ion conducting electrolyte 2 is present not only in an area between the cathode and anode, but also within the pores of the cathode and the anode. Accordingly, and as demonstrated in the far right panel of FIG. 1, the three dimensional geometry of the porous electrodes can provide for a very high contact area defining the three phase boundary of the cell.

In accord with typical lithium ion conducting electrochemical cells, the lithium ions can flow from the anode to the cathode during discharge of the cell to generate electrons and can flow from the cathode back to the anode under a charge cycle, with the half reactions at each electrode being as follows:

 Anode

 Cathode in which the active cathode material includes X,
the left to right pointing arrows in the above schemes indicate the discharge cycle reactions, and
the right to left pointing arrows in the above schemes indication the charge cycle reactions, The solid state lithium ion conducting electrolyte material is a composite material that includes a crosslinked lithium ion conducting polymer matrix in conjunction with lithium ion conducting ceramic particles held in the matrix.

The crosslinked lithium ion conducting polymer matrix can demonstrate both lithium ion conductivity and mechanical strength with excellent balance between the two. The polymer matrix can have a flexible open structure and can include a polysiloxane backbone and pendant side chains on the backbone for lithium ion conduction and for crosslinking.

A backbone component of the matrix can include crosslinked siloxanes formed of oligomers having the following general structure:

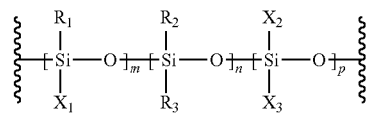

in which
m, n, and p are integers in which m+n+p is from 3 to about 300, for instance from about 5 to about 100 in some embodiments and at least one of m and p is 1 or more;
$X_1$, $X_2$, and $X_3$ are pendant side chain groups that can be the same or different from one another and include functionality configured to chelate lithium ions; and
$R_1$, $R_2$, and $R_3$ are the same or different from one another and can be a hydrogen, substituted alkyl or non-substituted alkyl. In one embodiment, $R_1$, $R_2$ and/or $R_3$ can include functionality for forming crosslinks within the polymer matrix.

A lithium chelating side chain $X_1$, $X_2$, and $X_3$ can include any suitable functionality as is known in the art configured for chelating lithium ions. In one embodiment, the lithium ion chelating functionality can include polyether or carbonate functionality.

In one embodiment, $X_1$, $X_2$, and/or $X_3$ side chain of the polymer matrix can have the general structure:

in which
Y is a linking group that can be a —$CH_2$— chain or a halogenated —$CH_2$— chain (generally of about 10 carbons or less), that optionally contains one or more of O, S, CO, COO, or OCO, (e.g., ethers, thioether, esters, etc.); or
Y has the structure of

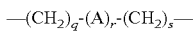

in which
q and s are integers and the sum of q+s is generally about 10 or less; A is O, S, CO, OCO, or COO; and r is 0 or 1; and Z is a polyether having the general structure of:

In which
t is from 2 to about 20 and
$R_4$ is hydrogen, hydroxy, alkyl, alkenyl, alkoxy, hydroxyalkyl, halogenated alkyl or halogenated alkenyl group; or
Z is a cyclic carbonate having the general structure:

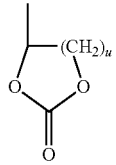

in which
u is 1 or 2.

Siloxane oligomers that form the crosslinked polymer matrix can generally include monomer units that include a lithium ion chelating functionality ($X_1$, $X_2$, and $X_3$ in the above structure) in an amount of about 50% or greater of the total monomer units of the oligomer, for instance about 80% or greater, or about 95% or greater in some embodiments. In general, the siloxane oligomers can likewise include monomer units free of the lithium ion chelating functionality (e.g., including $R_1$, $R_2$, and/or $R_3$ in the above structure) in an amount of about 50% or less of the total monomer units, for instance about 20% or less, or about 5% or less in some embodiments.

$R_1$, $R_2$, and/or $R_3$ can be hydrogen, hydroxy, hydroxy alkyl, alkenyl, alkoxy, hydroxyalkyl (e.g., —$(CH_2)_n$—OH, where n=1 to about 20, for instance 1 to about 6), halogenated alkyl or halogenated alkenyl group, generally including 6 or fewer carbon atoms. In one embodiment, one or more of $R_1$, $R_2$, and $R_3$ can include functionality capable of reacting with itself (i.e., self-crosslinking) or with another R or X group of the oligomer or with a separately provided crosslinking agent for crosslinking the polymer matrix. For instance, $R_1$, $R_2$, and/or $R_3$ pendant groups can be provided on the oligosiloxane from reaction of the backbone oligomer (or precursor monomers thereof) with ethylenically unsaturated monomers that can readily bond into the polymer backbone. The monomers may also be functionalized to the extent that they contain at least one heteroatom, such as nitrogen, oxygen, silicon, etc., as well as combinations thereof. For instance, suitable ethylenically unsaturated monomers may contain least one amide, epoxy, or alkoxysilane group. Specific examples of such monomers include, for instance, acrylamides, such as N-methylolacrylamide (NMA), N-methylolmethacrylamide, diacetoneacrylamide, etc., as well as esters or ethers thereof. Also suitable are epoxide-functional monomers, such as glycidyl methacrylate, glycidyl acrylate, allyl glycidyl ether, vinyl glycidyl ether, etc. Further examples are silicon-functional monomers, such as acryloxy-propyltri(alkoxy)silanes and methacryloxy-propyltri(alkoxy)silanes, vinyltrialkoxysilanes and vinylmethyldialkoxysilanes, with alkoxy groups which can be present being, for example, methoxy, ethoxy and ethoxypropylene glycol ether radicals. Yet other suitable crosslinking monomers have hydroxy and/or carboxyl groups, such as hydroxyalkyl methacrylates and acrylates (e.g., hydroxyethyl, hydroxypropyl or hydroxybutyl acrylate or methacrylate), acetylacetoxyethyl acrylate or methacrylate, dimethylaminoethyl acrylate, etc.

The functionalized oligosiloxanes that form the crosslinked polymer matrix can be homopolymers or copolymers including random or block copolymers. The oligomers can be terminated on the backbone by any of the typical termination groups that are conventional with polysiloxanes, for instance silyl groups such as trimethyl silyl.

The oligomers can be formed by derivatization of a starting oligosiloxane such as polymethylhydrosiloxane, polydimethylsiloxane (silanol terminated), or polydimethylsiloxane (vinyl dimethyl terminated) with X and/or R groups according to standard chemical practice as is generally known in the art, for instance through reaction with an ethylenically unsaturated monomer carrying the desired chelating or crosslinking functionality. The functionalized oligosiloxanes can generally have an average number average molecular weight of from about 400 to about 5000 (for instance from about 1500 to about 5000 in some embodiments) and can be a liquid at room temperature.

The polymer matrix can be crosslinked through reaction of either a lithium chelating pendant group, i.e., $X_1$, $X_2$, or $X_3$ in the above structure or via an $R_1$, $R_2$ or $R_3$ group of the above structure. However, if the matrix is crosslinked via a lithium chelating group, the crosslink density can generally be such to allow a portion of the lithium chelating groups to remain available for chelating and pendant, e.g., not reacted to form a crosslink.

The oligosiloxanes can self-crosslink or can be crosslinked with any suitable crosslinking agent such as silanes or hydrocarbons carrying alkoxy, alkene, acyl, or acrylate groups capable of reacting with functionality of the oligomers. For instance, exemplary crosslinking agents include, without limitation, methyltrimethoxysilane, methyltriethoxysilane, methyltriacetoxysilane, tetramethoxysilane, tetraethoxysilane, tetraacetoxysilane, vinylmethyldiethoxysilane, vinylmethyldiacetoxysilane, and mixtures thereof.

In one embodiment, a crosslinking agent can have the following general structure:

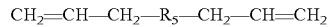

in which
$R_5$ is selected from
O—$(CH_2CH_2O)_j$ in which j is from 4 to about 30; and
Si—O—$(Si—O)_k$—Si in which k is from 5 to about 30.

The crosslinked polymer matrix can be prepared from a single oligosiloxane or a mixture of oligosiloxanes having different average molecular weights, different backbone substituents, and different side-chains and can be crosslinked with a single crosslinking agent or a mixture of crosslinking agents.

Figure 2:
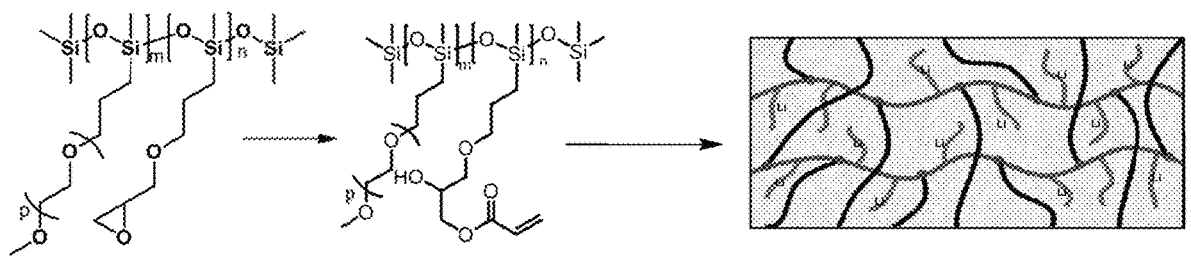
FIG. 2 illustrates the structure of one embodiment of polysiloxane precursors that may be crosslinked via radical initiated polymerization to form a crosslinked lithium ion conducting polymer matrix of a solid state electrolyte as described herein

FIG. 2 illustrates the synthesis concept for a crosslinked polymer matrix that includes a polyether lithium ion chelating group and an epoxide crosslinking group. As shown, the epoxide-containing group can be reacted with a crosslinking agent, e.g., an acrylate-containing crosslinking agent to form the crosslinked polymer matrix including pendent polyether lithium ion chelating side chains, as shown.

The crosslinking reaction to form the matrix can be carried out in the presence of a lithium salt in order to provide solubilized lithium ions in the solid state electrolyte. Suitable lithium salts can include, without limitation, $LiClO_4$, $LiAsF_6$, $LiPF_6$, $LiCF_3SO_4$, and the like as well as mixtures of lithium salts.

The lithium cations can be incorporated into the solid state electrolyte in one embodiment in amounts such that the ratio of pendant chelating groups of the crosslinked polymer matrix to lithium ions in the electrolyte is from about 40:1 to about 5:1, for instance from about 30:1 to about 10:1, or from about 20:1 to about 10:1 in some embodiments.

In addition to the crosslinked polymer matrix and the lithium ions, the solid state electrolyte can include lithium ion conducting particles. Particles can include lithium ion conducting materials such as lithium metal phosphates and/or ceramic oxides. For instance, the particles can include a lithium based ceramic such as a garnet-type ceramic, e.g., a lithium lanthanum titanate ($Li_xLa_yTi_zO_n$), lithium lanthanum tantalums ($Li_xLa_yTa_zO_n$), lithium lanthanum zirconates ($Li_xLa_yZr_zO_n$), etc. Specific examples of suitable lithium ion conductors include those with the cubic garnet structure such as aluminum-stabilized $Li_7La_3Zr_2O_{12}$ or with the perovskite structure such as $Li_{3x}La_{0.67-x}TiO_3$. Other examples include $LiNbO_3$, $YVO_4$, $Al_2O_3$, and $Ce_2O_3$-doped $Y_3Al_5O_{12}$ (YAG:Ce).

The particles may possess areas (generally internal) that can include other materials such as, without limitation, aluminum phosphate, titanium dioxide, aluminum oxide, or combinations thereof. It is noted that the compositional profile of the particles can be controlled by doping to attain desired properties.

The particles can generally be of a size on the order of nanometers (nm) or micrometers (μm). For instance, the particles can have a largest dimension of about 500 μm or less, about 100 μm or less, about 50 μm or less or about 10 μm or less in some embodiments. Smaller particles are contemplated in other embodiments. For instance, the particles can have a largest diameter of about 500 nm or less, or about 100 nm or less, for instance from about 10 nm to about 100 nm in some embodiments.

The electrolyte can generally include the ceramic lithium ion conducting particles in an amount of about 20 wt. % or more by weight of the electrolyte, for instance from about 20 wt. % by weight of the electrolyte to about 80 wt. % by weight of the electrolyte.

The oligosiloxane precursors can be liquid, and as such after being combined with the lithium salts and the lithium ion conducting particles, the mixture can be easily shaped and/or located as desired prior to crosslinking. For instance the oligomer, lithium salts, and lithium ion conducting particles can be combined with a suitable solvent system and catalysts (as necessary) to form a liquid mixture that can be applied and shaped as desired prior to crosslinking. Typical solvents are encompassed including, without limitation, acetonitrile, acetone, tetrahydrofuran, benzene, and mixtures thereof. Any known crosslinking catalyst can be employed, as necessary, such as platinum divinyl tetramethyldisiloxane acetic acid or titanium (IV) triethanolaminate isopropoxide.

Referring again to FIG. 1, the electrochemical cell 10 can include a cathode 4 that can include a cathode current collector 14, a porous cathode support 8 and a cathode active material 12 carried on the porous cathode support 8.

The cathode current collector 14 and the porous cathode support 8 can be in electrical communication with one another and can be formed of the same or different materials. Moreover, depending upon the strength and stability of the porous cathode support 8, a backing current collector 14 may not be necessary in some embodiments, and the porous cathode support 8 can function as the cathode current collector.

In one embodiment, an aluminum foam, for instance a commercial grade aluminum foam as is known in the art, can be utilized as a porous cathode support 8. Other materials as are known in the art can be utilized such as nickel foam and carbon foam. In one embodiment, an aluminum porous cathode support 8 can be supported by an external aluminum current collector 14. In those embodiments in which both the external current collector 14 and the internal porous support 8 both include aluminum, the two components can be a single, monolithic component or can be attached to one another so as to provide the necessary electrical communication to the cathode active material 12.

The cathode active material 12 can be a metal oxide intercalation cathode active material as is known. The cathode can include a metal oxide compound in conjunction with other components such as graphite and an electrolyte/binder that can provide ionic transport, or can include only the metal oxide intercalation material, as desired.

The metal oxide cathode active material can be prepared having a unit structure characterized by the ability to insert lithium ions via an electrochemical reaction. Such compounds are referred to as intercalation compounds and include transition metal oxides having reversible lithium insertion ability. By way of example, the transition metal of the cathode active material can include one or more of V, Co, Mn, Fe and Ni.

In one embodiment, the cathode active material may be lithiated and can be represented by the general formula $Li_xZ_yO_a$ in which Z represents a transition metal, and x, y and a are each greater than or equal to one. In one embodiment, $0.9 \le x \le 1.1$, $y=1$ and $1.9 \le a \le 2.05$. In the case of a lithiated vanadium oxide cathode active material, the material can be represented by the general formula $Li_xV_yO_z$ where $1 \le x \le 1.2$, $y=3$ and $8 \le z \le 8.1$. Examples of lithiated metal oxide compounds for use as a cathode active material can include, without limitation, $LiV_3O_8$, $LiMnO_2$, $LiMn_2O_4$, $LiCoO_2$, $LiNiO_2$, $LiNi_{1-x}Co_xO_2$ (0<x<1), etc.

The cathode active material 12 can be directly deposited on a surface of the porous cathode support 8. For instance, methods such as chemical vapor deposition and one-pot hydrothermal deposition can be utilized to coat a cathode active material (e.g., a layered-oxide film) on a surface of the porous cathode support 8.

Figure 3:
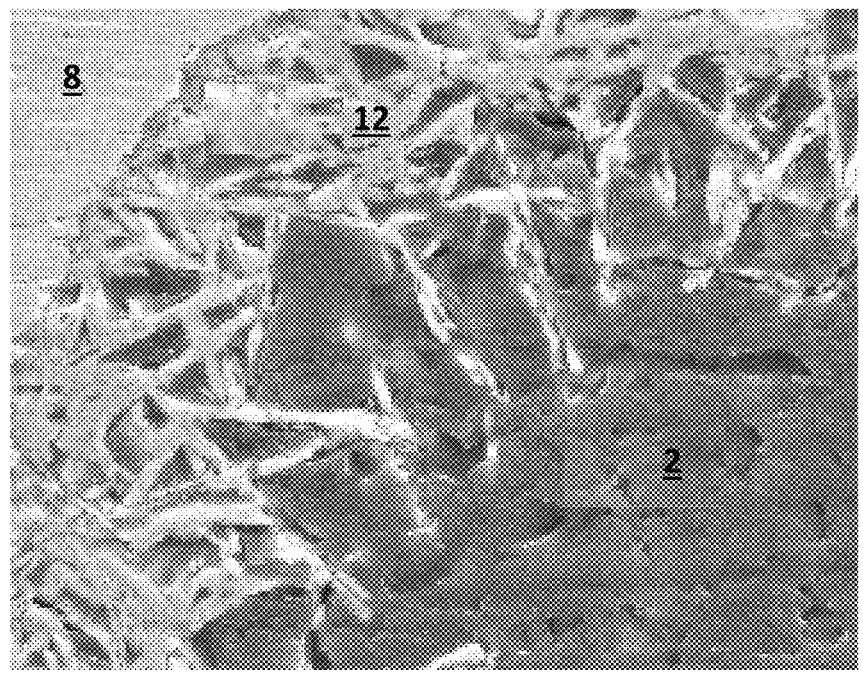
FIG. 3 illustrates one embodiment of a porous cathode including porous $CoO_x$ active material deposited on the wall of a porous aluminum foam.

By way of example, FIG. 3 illustrates the microstructure of a hydrothermal derived porous cathode active material layer 12 of $CoO_x$ deposited on the surface of an aluminum foam as cathode support 8.

In addition to the solid state electrolyte 2, and the cathode 4, an electrochemical cell 10 can include an anode 6. The anode 6 can include a porous anode active material 16 and an anode current collector 18. In general, metallic lithium or a lithium alloy can be employed as anode active material 16, so as to take advantage of the high energy density of lithium metal. Lithium alloys as may be contemplated for use as an anode active material 16 can include, without limitation, lithium/copper alloys and lithium/zinc alloys.

A porous active anode material can be formed in one embodiment through dissolution of a gas, e.g., hydrogen, into a melt of the active anode material at high pressure. Upon depressurization and casting, pores can be formed in the sheet of active anode material. In one embodiment, the active anode material can be selected to increase solubility of a desired gas. For example, a lithium/copper alloy can be utilized as copper has desirable electrical and thermal conductivity as well as high solubility of $H_2$. Accordingly, to form the porous anode active material, $H_2$ can be dissolved into a Li—Cu melt at increased pressure (e.g., about 0.1 to about 2.0 MPa). After equilibrium, the $H_2$-satuated melt can be depressurized and quickly cast into a solid sheet. Fine porosities can be developed within the solid sheet as $H_2$ evolves during solidification.

In those embodiments in which the electrochemical cell 10 is fabricated in a charged state with a lithium metal-containing material as anode active material 16, a metal oxide intercalation cathode active material 12 can function as a sink to accept lithium ions from the lithium metal of the anode through the intercalation chemistry during the first discharge cycle. Alternatively, if a lithiated metal oxide is used as the active cathode material 12, the electrochemical cell 10 can be used in a discharged state with a non-lithium metal as an anode active material such as Si, Sn, As, Sb or their alloys including, without limitation, $Mg_2Si$, NiSi, FeSi, $CoSi_2$, $FeSi_2$ and $NiSi_2$.

The active anode material 16 can be held in electrical communication with an external anode current collector 18 such as, for example a copper foil as is known in the art.

Figure 4:
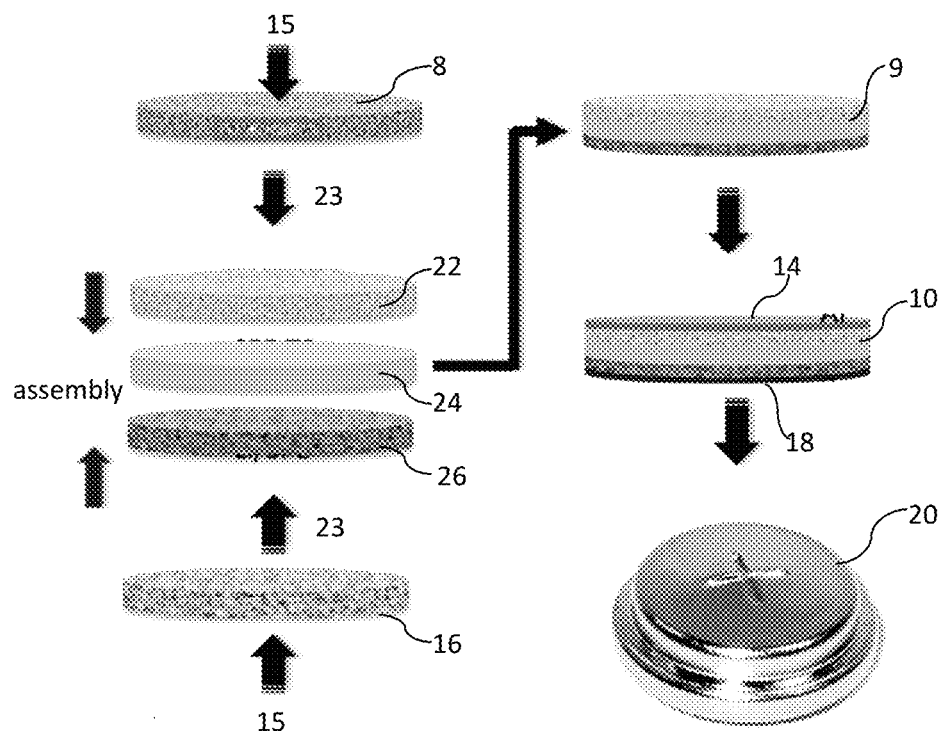
FIG. 4 is a schematic illustration of a process as may be utilized to fabricate an electrochemical cell as described herein.

FIG. 4 schematically illustrates one method for forming an electrochemical cell 10 and a battery 20 incorporating the cell 10. In this embodiment cathode, electrolyte, and anode sub-assemblies 22, 24, 26 respectively, can be formed followed by lamination of the three sub-assemblies into an electrochemical cell 10.

The cathode and anode sub-assemblies 22, 26 can be formed by impregnation of the liquid electrolyte mixture 15 (including the functionalized oligosiloxanes, lithium salts, and lithium ion conducting particles as described above) into the porous electrodes 8, 16, for instance by application under pressure, followed by crosslinking 23 of the polymer to provide the solid state electrolyte within the pores of the electrodes in the cathode and anode sub-assemblies 22, 26. The sub-assembly formation can provide the solid state electrolyte composite material intimately contacted with the electrode active material within the pores of the electrodes. This can increase the area of contact between the electrolyte and the active materials. In addition, the contact between the solid electrolyte composite material and the active materials of the electrodes can be intimate, ensuring excellent interfacial properties for fast charge-transfer and low-resistance current collections.

An electrolyte sub-assembly 24 can also be formed to provide a bulk separation distance between the electrodes. For instance, the electrolyte sub-assembly 24 can be a thin film (e.g., about 1 millimeter or less in thickness, for instance from about 10 μm to about 500 μm in some embodiments. In general, to form the electrolyte sub-assembly 24, a liquid electrolyte mixture as described herein can be cast into a desired shape and crosslinked.

Following formation, the three sub-assemblies 22, 24, 26 can be assembled, for instance through application of heat and/or pressure, to form a single monolithic cell structure 9. Alternatively, rather than pre-forming a solid electrolyte sub-assembly, a portion of the liquid mixture that includes the oligomer precursors can be placed between the electrode sub-assemblies, and the oligomers can then be crosslinked to attach the electrodes to one another and form additional electrolyte extending between the electrodes.

In those embodiments in which separate current collectors are located on one or both of the electrodes, the current collectors 14, 18 can be applied to the cell following assembly. For instance, thin and dense films of an aluminum cathode current collector 14 and a copper anode current collector 18 can be sputtered or otherwise formed on the electrochemical cell 10. A battery 20 can include one or more of the cells 10 sealed into a case according to standard methodology.

The electrochemical cells can provide high energy-density, high cycling rates (high power capability) and safer battery technology. The electrochemical cells can be used to form lightweight metal-supported solid state lithium ion batteries that can meet existing challenges in battery technology. Moreover, the electrochemical cells can find immediate applications in electric vehicles, aerospace applications, and renewable and grid energy storage, among others.

While certain embodiments of the disclosed subject matter have been described using specific terms, such description is for illustrative purposes only, and it is to be understood that changes and variations may be made without departing from the spirit or scope of the subject matter.

What is claimed is:

1. A method of forming an electrochemical cell comprising:
   combining an oligosiloxane with a lithium salt and lithium ion conducting ceramic particles to form a mixture, the mixture comprising lithium ions solubilized from the lithium salt, the oligosiloxane comprising lithium ion chelating functionality and crosslinking functionality;
   impregnating pores of a porous electrode with a first portion of the mixture; and
   crosslinking the oligosiloxane to form an electrode sub-assembly including a solid-state electrolyte within the pores of the electrode, the solid-state electrolyte comprising a crosslinked polymer matrix that includes the crosslinked oligosiloxane, the solid-state electrolyte including the lithium ions associated with the crosslinked oligosiloxane and the lithium ion conducting particles encapsulated in the crosslinked polymer matrix.

2. The method of claim 1, the lithium ion chelating functionality comprising polyether functionality or carbonate functionality.

3. The method of claim 2, the polyether functionality having the structure of:

in which
t is from 2 to about 20 and
$R_4$ is hydrogen, hydroxy, alkyl, alkenyl, alkoxy, hydroxyalkyl, halogenated alkyl or halogenated alkenyl group.

4. The method of claim 2, the carbonate functionality having the structure of:

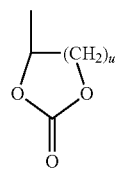

in which u is 1 or 2.

5. The method of claim 1, the oligosiloxane comprising side chains having the structure of:

in which
Y is a linking group that is a —$CH_2$— chain or a halogenated —$CH_2$— chain of about 10 carbons or less, and optionally contains one or more of O, S, CO, COO, or OCO, and
Z includes polyether or cyclic carbonate functionality.

6. The method of claim 5, wherein Y has the structure of:

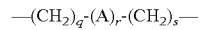

in which q and s are integers and the sum of q+s is about 10 or less,

A is O, S, CO, OCO, or COO, and r is 0 or 1.

7. The method of claim 1, the lithium ion conducting particles including a ceramic oxide.

8. The method of claim 1, the lithium ion conducting particles comprising a lithium lanthanum titanate, a lithium lanthanum tantalum, or a lithium lanthanum zirconate.

9. The method of claim 1, the lithium ion conducting particles comprising aluminum-stabilized $Li_7La_3Zr_2O_{12}$, $Li_{3x}La_{0.67-x}TiO_3$, $LiNbO_3$, $YVO_4$, $Al_2O_3$, or $Ce_2O_3$-doped $Y_3Al_5O_{12}$.

10. The method of claim 1, wherein the electrode is a cathode, the method further comprising locating a cathode current collector in electrical communication with the cathode.

11. The method of claim 1, wherein the electrode is an anode, the method further comprising locating an anode current collector in electrical communication with the anode.

12. The method of claim 1, the oligosiloxane comprising the structure:

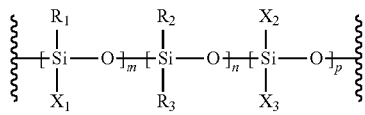

in which:

m, n, and p are integers in which m+n+p is from 3 to about 300 and at least one of m and p is 1 or more;

$X_1$, $X_2$, and $X_3$ are pendant side chain groups that are the same or different from one another and include the lithium ion chelating functionality; and $R_1$, $R_2$, and $R_3$ are the same or different from one another and are a hydrogen, substituted or non-substituted alkyl and optionally include the crosslinking functionality.

13. The method of claim 1, the mixture further comprising a crosslinking agent.

14. The method of claim 13, the crosslinking agent including a silane or hydrocarbon carrying alkoxy, alkene, acyl, or acrylate groups.

15. The method of claim 1, further comprising:

placing a second portion of the mixture on a surface of the electrode sub-assembly; and crosslinking the second portion of the mixture to form an electrolyte sub-assembly.

16. The method of claim 15, further comprising assembling the electrolyte sub-assembly between the electrode sub-assembly and a second electrode to form an electrochemical cell.

17. The method of claim 16, wherein the second electrode is in the form of a second electrode sub-assembly formed according to a method that includes:

impregnating pores of the second electrode with a third portion of the mixture, and crosslinking the oligosiloxane of the third portion of the mixture to form the second electrode sub-assembly including the solid-state electrolyte within the pores of the second electrode.

18. The method of claim 1, further comprising:

crosslinking a second portion of the mixture to form an electrolyte sub-assembly;

placing the electrolyte sub-assembly on a surface of the electrode sub-assembly; and applying heat and/or pressure to the combined electrolyte sub-assembly and the electrode sub-assembly to laminate the sub-assemblies to one another.

\* \* \* \* \*